UNITED STATES PATENT OFFICE.

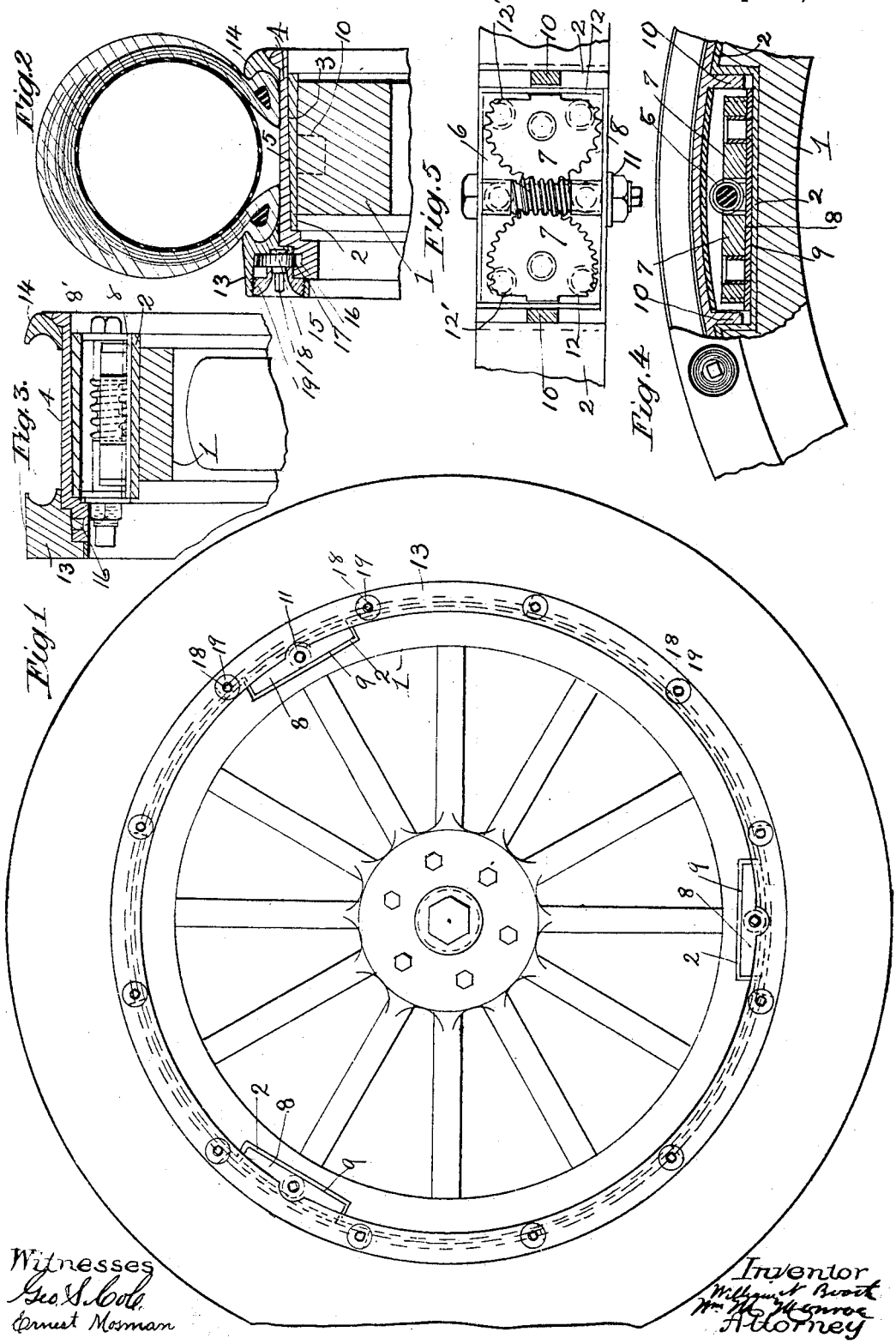

WILLIAM N. BOOTH, OF CLEVELAND, OHIO.

DEMOUNTABLE RIM FOR AUTOMOBILE-TIRES.

954,416. Specification of Letters Patent. Patented Apr. 12, 1910.

Application filed April 12, 1909. Serial No. 489,482.

*To all whom it may concern:*

Be it known that I, WILLIAM N. BOOTH, a citizen of the United States, and resident of Cleveland, in the county of Cuyahoga and State of Ohio, have invented certain new and useful Improvements in Demountable Rims for Automobile-Tires, of which I hereby declare the following to be a full, clear, and exact description, such as will enable others skilled in the art to which it pertains to make and use the same.

This invention relates to improvements in demountable rims for automobiles wheels, and the objects of the invention are to provide simple and efficient instrumentalities for securely fastening the demountable rim to a fixed rim on the felly, and the invention also has reference to a simple and efficient device for attaching the tire to the demountable rim.

One of the important features of the mechanism is the positive locking means employed for securing the demountable rim to the fixed rim which is of such character that it can not work loose or permit a rattling noise.

Further objects are to provide devices for these purposes which can readily be understood and operated by ordinary individuals or automobile owners, so that an injury to a tire while on the road will not prevent the continuation of the trip. The demountable rim and tire fastening devices are also so arranged that the rim can be attached to a spare inflated tire, and can be carried with the machine and be ready for use at any moment.

The invention comprises, the employment in connection with a fixed rim having an inclined face, of a demountable rim preferably provided with a correspondingly inclined inner annular surface adapted to engage closely the inclined surface of the fixed rim, and instrumentalities for forcing the demountable rim over the fixed rim and for locking the parts securely together. In this manner the wedging surfaces are maintained in such close engagement that they can not become loosened, except by forcing them apart by reversing the movements of the mechanical devices employed to force them together.

The invention further consists in the worm screw and gear mechanism employed for this purpose, in conjunction with engaging members in the demountable rim. And an important feature of the invention is shown in the rotatable locking devices mounted in one of the clencher holding rings, and the annular groove in the demountable rim in which said locking devices are adapted to enter.

The invention is hereinafter more fully described, shown in the accompanying drawings, and specifically pointed out in the claims.

In the accompanying drawings, Figure 1 is a side elevation of the device shown attached to the wheel; Fig. 2 is a transverse section of the wheel and felly showing the fixed rim, the demountable rim, and one of the locking devices for the detachable ring which clamp the clencher tire in place; Fig. 3 is a similar section through the worm and gear locking device for the demountable rim; Fig. 4 is a longitudinal section of the same; Fig. 5 is a plan view of the worm and gear locking device, with the cover of the gear case removed to show the parts more clearly.

In these views 1 is the wheel felly, 2 is the fixed rim which is preferably inclined at 3 on its outer face, 4 is the demountable rim, preferably provided with a correspondingly inclined inner surface 5 adapted to fit closely upon the fixed rim and make a wedging engagement therewith when forced thereon. The demountable rim is slidingly movable upon the fixed rim until they are in close engagement.

In this device the means employed for forcing the demountable rim upon the fixed rim is of such a character that it is self locking, and the demountable rim and fixed rim can not be separated except through the releasing agency of the same device.

The device comprises a worm screw 6, intermediately placed between and engaging the duplicate form wheels 7, 7. These parts are inclosed in a case 8, which is secured in a recess 9, formed in the felly and fixed rim of the wheel, so that the worm wheels will be located inside of the circle of the demountable rim. 8' is the cover for this case. Lugs 10, 10 depending from the demountable rim are respectively engaged by the worm wheels 7, 7 which of course turn in the same direction at their edges farthest from the screw and transversely of the fixed rim. The worm screw extends through the case at 11, and is squared for the use of a wrench to turn it with, and when turned the flat surfaces 12, 12 and 12', 12' of the worm wheels engage the lugs alternately and move them in one direction or the other to force the demountable rim on or off from the fixed rim as desired. Wherever placed it will be impossible to move the demountable rim unless the worm screw is operated by hand except in the middle position shown in Fig. 5 where the gear is not in engagement with the lugs.

As many of these locking devices can be employed and spaced about the rim as may be desired, thus preventing warping or twisting of the rim at any point. The lugs also prevent circumferential movement or stripping upon the felly rim, and for this reason the lugs engage the opposite end walls of the gear case. The fixed rim is provided with the recesses 9, 9 spaced regularly therein and corresponding recesses are preferably formed in the felly.

The locking device for the clencher tire is clearly shown in Fig. 2 where the demountable rim is provided upon its periphery with the outer sliding clencher ring 13, and with the inner ring 14, which can be either fixed or movable at pleasure. In the outer ring 13 are secured at intervals the disks 15, 15 which are adapted to engage with the annular groove 16 in the outer edge of the demountable rim. These disks have a flat side 17 which permits of releasing them from the groove 16, and they can be turned to engage the groove by means of the projecting square heads 18. A plug 19 secures each one in place.

I have mentioned the inclined surfaces as wedging tightly together, and they also serve to prevent the demountable rim from sliding completely over the fixed rim, at the near side. Any other means for preventing this action however are within the scope of the claims.

Having described the invention what I claim as new and desire to secure by Letters Patent is:

1. In combination, a fixed rim, a demountable rim adapted to fit closely thereon, said parts having inclined engaging surfaces, a pair of lugs on said demountable rim, a worm and wheel locking device intermediate between said pair of lugs and mounted in said fixed rim, and adapted and arranged to engage said pair of lugs to force said demountable rim on and off from said fixed rim.

2. In combination, a fixed rim, a demountable rim, adapted to be sleeved thereon, said members having inclined meeting faces, a lug extending from the demountable rim, and a worm and wheel device in said fixed rim adapted to engage said lug, to force said demountable rim upon said fixed rim and to release it therefrom.

3. In combination, a fixed rim, provided with a series of recesses, a demountable rim, adapted to be sleeved thereon, a pair of spaced lugs extending from said demountable rim into each of said recesses and adapted to engage the end walls thereof, and a worm and wheel device in each recess, adapted to engage simultaneously said pair of lugs to force said demountable rim transversely on and off from said fixed rim.

4. In combination, a fixed rim, provided with a series of spaced recesses, a demountable rim adapted to be sleeved thereover, pairs of lugs on the demountable rim spaced apart and adapted to enter said recesses, a worm screw centrally mounted between said lugs in each recess, duplicate worm wheels engaging said worm screw on two sides, and outer faces for said wheels adapted to engage said lugs, whereby when said worm screw is turned in one direction said demountable rim can be forced on the fixed rim, and when turned in another direction said demountable rim can be forced off from the fixed rim.

5. In combination, a fixed rim, a demountable rim thereon, a sliding clencher ring, said rim having an annular groove in its outer face, a series of cams in said sliding ring, each cam adapted to engage the side of said groove or alternately to be disengaged therefrom, said sliding ring provided with threaded openings at intervals in its outer edge, a threaded plug in each opening, and a cam in each opening adapted to be secured in place by said plug, said cam provided with a flat face and with a projecting head.

6. The combination with a demountable rim, provided with an annular groove in its outer face, of a ring slidingly movable upon said rim, and provided with a series of openings, a plug in each opening, a rotatable disk pivoted in each opening and adapted to engage with the side of said groove, each disk provided with a flat edge, said plug serving as a securing means for each disk in its respective opening, and means for rotating said disks to alternately engage and disengage with the sides of said grooves.

7. The combination with a fixed rim, of a worm screw and worm wheel, mounted thereon, said worm wheel having engaging faces, a demountable rim sleeved over said fixed rim, and a lug upon said demountable rim, said lug adapted to be engaged alternately by said faces in said worm gear to advance said demountable rim upon said fixed rim and to remove it therefrom; substantially as described.

8. The combination with a fixed rim, of a worm screw and worm wheels mounted in the periphery thereof, and spaced apart thereon, a demountable rim adapted to be sleeved over said fixed rim, and spaced lugs upon said demountable rim, adapted to be engaged by said wheels to move said demountable rim on and off from said fixed rim.

In testimony whereof, I hereunto set my hand this 8th day of April 1909.

WILLIAM N. BOOTH.

In presence of—
 WM. M. MONROE,
 GEO. S. COLE.